(12) United States Patent
Gutta et al.

(10) Patent No.: US 6,801,917 B2
(45) Date of Patent: Oct. 5, 2004

(54) METHOD AND APPARATUS FOR PARTITIONING A PLURALITY OF ITEMS INTO GROUPS OF SIMILAR ITEMS IN A RECOMMENDER OF SUCH ITEMS

(75) Inventors: Srinivas Gutta, Yorktown Heights, NY (US); Kaushal Kurapati, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 370 days.

(21) Appl. No.: 10/014,216

(22) Filed: Nov. 13, 2001

(65) Prior Publication Data

US 2003/0097353 A1 May 22, 2003

(51) Int. Cl.[7] .......................... G06F 17/30; G06F 7/00; G06F 17/00
(52) U.S. Cl. ........................... 707/102; 707/1
(58) Field of Search .................... 707/1, 102

(56) References Cited

U.S. PATENT DOCUMENTS

| | | | |
|---|---|---|---|
| 5,544,256 A | * | 8/1996 | Brecher et al. ............. 382/149 |
| 5,758,257 A | | 5/1998 | Herz et al. ...................... 455/2 |
| 5,940,825 A | * | 8/1999 | Castelli et al. ................. 707/6 |
| 6,029,195 A | * | 2/2000 | Herz ........................... 725/116 |
| 6,088,722 A | * | 7/2000 | Herz et al. .................. 709/217 |

OTHER PUBLICATIONS

Cost et al., "A Weighted Nearest Neighbor Algorithm for Learning with Symbolic Features,".

Kittler et al., "Combining Classifiers," Inter'l Conf. on Pattern Recognition, vol. II Track B, 897–901, (1996).

Stanfill et al., "Toward Memory–Based Reasoning," Communications of the ACM, vol. 29, 1213–1228, (1986).

Gath et al: "Unsupervised optimal fuzzy clustering" IEEE Transactions On Pattern Analysis And Machine Intelligence, Jul. 1989, pp. 773–781.

Cost et al: "A Weighted Nearest Neighbor Algorithm for Learning With Symbolic Features" Machine Learning, vol. 10, 1993, pp. 57–58.

* cited by examiner

Primary Examiner—Wayne Amsbury
Assistant Examiner—Cindy Nguyen
(74) Attorney, Agent, or Firm—Dicran Halajian (57) ABSTRACT

A method and apparatus are disclosed for recommending items of interest to a user, such as television program recommendations, before a viewing history or purchase history of the user is available. A third party viewing or purchase history is processed to generate stereotype profiles that reflect the typical patterns of items selected by representative viewers. A user can select the most relevant stereotype(s) from the generated stereotype profiles and thereby initialize his or her profile with the items that are closest to his or her own interests. A clustering routine partitions the third party viewing or purchase history (the data set) into clusters using a k-means clustering algorithm, such that points (e.g., television programs) in one cluster are closer to the mean of that cluster than any other cluster. The value of k is incremented until (i) further incrementing of k does not yield any improvement in the classification accuracy, (ii) a predefined performance threshold is reached, or (iii) an empty cluster is detected.

30 Claims, 8 Drawing Sheets

PROGRAM DATABASE - 200

| DATA/TIME 240 | CHANNEL 245 | TITLE 250 | GENRE 255 | ... | ACTOR 270 |
|---|---|---|---|---|---|
| 11/18/99 -- 8:00 P.M. | CH1 | LUCY | COMEDY | | CLINT DENIRO |
| 11/18/99 -- 8:30 P.M. | CH1 | AL'S FAMILY | SITCOM | | JENNIFER COX |
| 11/18/99 -- 9:00 P.M. | CH3 | YOUR HOUSE | DRAMA | | LUCY VANCE |

CHANNEL FEATURE VALUE OCCURRENCE TABLE -- 700

| FEATURE VALUES | CLASSES | |
| --- | --- | --- |
| | WATCHED | NOT WATCHED |
| EBC | 353 | 0 |
| ASPN | 1 | 18 |
| ABS | 145 | 5 |

FIG. 7A

FEATURE VALUE PAIR DISTANCE TABLE -- 750

| | EBC | ASPN | ABS |
| --- | --- | --- | --- |
| EBC | 0 | 1.895 | 0.066 |
| ASPN | 1.895 | 0 | 1.828 |
| ABS | 0.066 | 1.828 | 0 |

METHOD AND APPARATUS FOR PARTITIONING A PLURALITY OF ITEMS INTO GROUPS OF SIMILAR ITEMS IN A RECOMMENDER OF SUCH ITEMS

CROSS-REFERENCE TO RELATED APPLICATIONS

The present invention is related to U.S. patent application Ser. No. 10/014,180 entitled "Method and Apparatus for Evaluating the Closeness of Items in a Recommender of Such Items," U.S. patent application Ser. No. 10/014,192 entitled "Method and Apparatus for Generating A Stereotypical Profile for Recommending Items of Interest Using Item-Based Clustering," U.S. patent application Ser. No. 10/014,202 entitled "Method and Apparatus for Recommending Items of Interest Based on Preferences of a Selected Third Party," U.S. patent application Ser. No. 10/014,195 entitled "Method and Apparatus for Recommending Items of Interest Based on Stereotype Preferences of Third Parties," and U.S. patent application Ser. No. 10/014,189 entitled "Method and Apparatus for Generating a Stereotypical Profile for Recommending Items of Interest Using Feature-Based Clustering," each filed contemporaneously herewith, assigned to the assignee of the present invention and incorporated by reference herein.

FIELD OF THE INVENTION

The present invention relates to methods and apparatus for recommending items of interest, such as television programming, and more particularly, to techniques for recommending programs and other items of interest before the user's purchase or viewing history is available.

BACKGROUND OF THE INVENTION

As the number of channels available to television viewers has increased, along with the diversity of the programming content available on such channels, it has become increasingly challenging for television viewers to identify television programs of interest. Electronic program guides (EPGs) identify available television programs, for example, by title, time, date and channel, and facilitate the identification of programs of interest by permitting the available television programs to be searched or sorted in accordance with personalized preferences.

A number of recommendation tools have been proposed or suggested for recommending television programming and other items of interest. Television program recommendation tools, for example, apply viewer preferences to an EPG to obtain a set of recommended programs that may be of interest to a particular viewer. Generally, television program recommendation tools obtain the viewer preferences using implicit or explicit techniques, or using some combination of the foregoing. Implicit television program recommendation tools generate television program recommendations based on information derived from the viewing history of the viewer, in a non-obtrusive manner. Explicit television program recommendation tools, on the other hand, explicitly question viewers about their preferences for program attributes, such as title, genre, actors, channel and date/time, to derive viewer profiles and generate recommendations.

While currently available recommendation tools assist users in identifying items of interest, they suffer from a number of limitations, which, if overcome, could greatly improve the convenience and performance of such recommendation tools. For example, to be comprehensive, explicit recommendation tools are very tedious to initialize, requiring each new user to respond to a very detailed survey specifying their preferences at a coarse level of granularity. While implicit television program recommendation tools derive a profile unobtrusively by observing viewing behaviors, they require a long time to become accurate. In addition, such implicit television program recommendation tools require at least a minimal amount of viewing history to begin making any recommendations. Thus, such implicit television program recommendation tools are unable to make any recommendations when the recommendation tool is first obtained.

A need therefore exists for a method and apparatus that can recommend items, such as television programs, unobtrusively before a sufficient personalized viewing history is available. In addition, a need exists for a method and apparatus for generating program recommendations for a given user based on the viewing habits of third parties.

SUMMARY OF THE INVENTION

Generally, a method and apparatus are disclosed for recommending items of interest to a user, such as television program recommendations. According to one aspect of the invention, recommendations are generated before a viewing history or purchase history of the user is available, such as when a user first obtains the recommender. Initially, a viewing history or purchase history from one or more third parties is employed to recommend items of interest to a particular user.

The third party viewing or purchase history is processed to generate stereotype profiles that reflect the typical patterns of items selected by representative viewers. Each stereotype profile is a cluster of items (data points) that are similar to one another in some way. A user selects stereotype(s) of interest to initialize his or her profile with the items that are closest to his or her own interests.

A clustering routine partitions the third party viewing or purchase history (the data set) into clusters, such that points (e.g., television programs) in one cluster are closer to the mean of that cluster than any other cluster. A mean computation routine is also disclosed to compute the symbolic mean of a cluster. A given data point, such as a television program, is assigned to a cluster based on the distance between the data point to each cluster using the mean of each cluster.

The programs or other items in the third party viewing or purchase history are partitioned into k clusters of similar items using a k-means clustering algorithm. According to one aspect of the invention, the disclosed clustering routine employs a dynamic value of k. The value of k is incremented until (i) further incrementing of k does not yield any improvement in the classification accuracy, (ii) a predefined performance threshold is reached, or (iii) an empty cluster is detected. The performance of the clustering technique may be improved by representing a cluster with multiple means (or multiple feature values for each possible feature). When the mean is comprised of multiple programs, the mean is more likely to be representative of the entire cluster, and additional variability is introduced into the clustering process.

A more complete understanding of the present invention, as well as further features and advantages of the present invention, will be obtained by reference to the following detailed description and drawings.

DETAILED DESCRIPTION

Figure 1:
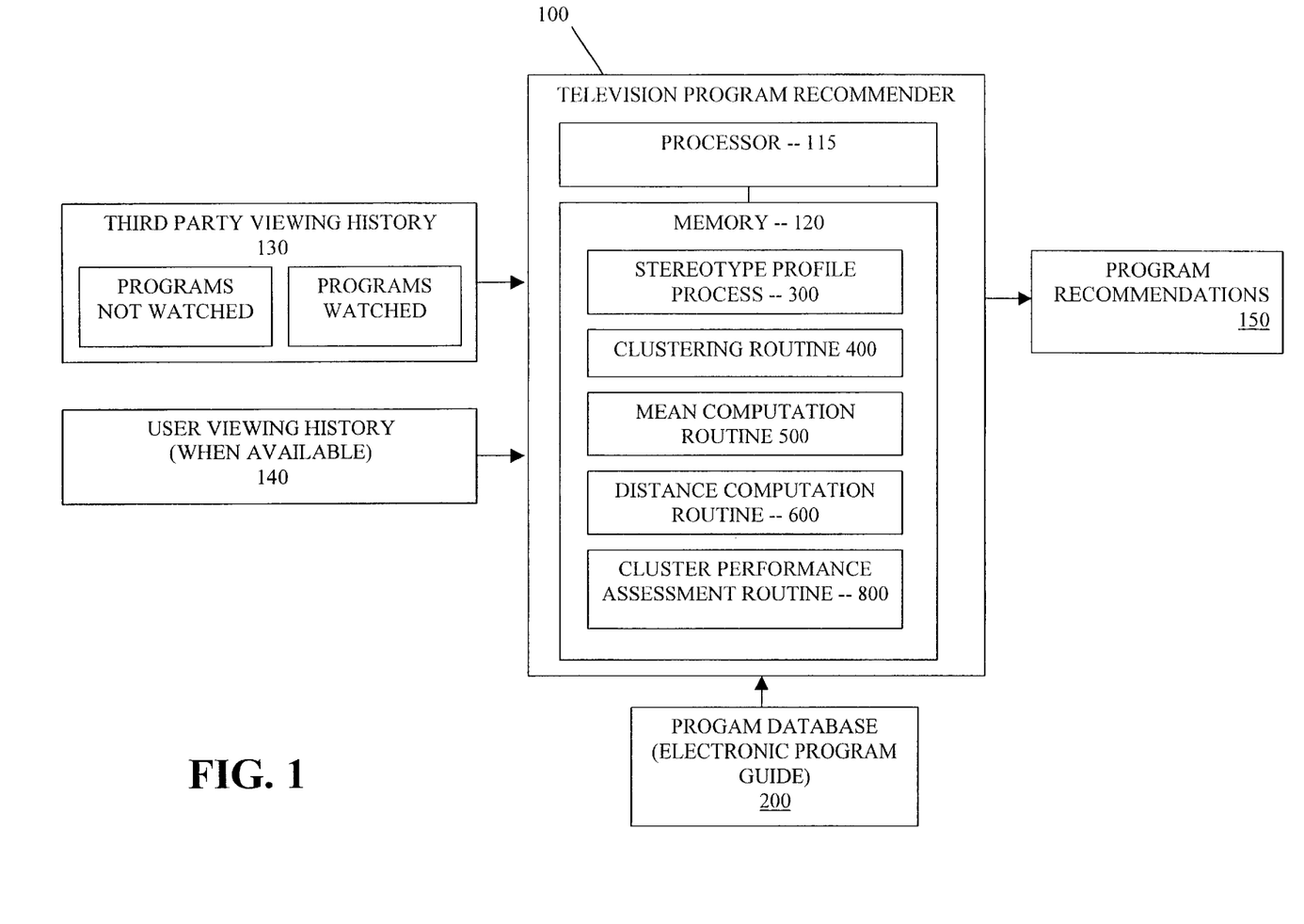
FIG. 1 is a schematic block diagram of a television program recommender in accordance with the present invention.

FIG. 1 illustrates a television programming recommender 100 in accordance with the present invention. As shown in FIG. 1, the exemplary television programming recommender 100 evaluates programs in a program database 200, discussed below in conjunction with FIG. 2, to identify programs of interest to a particular viewer. The set of recommended programs can be presented to the viewer, for example, using a set-top terminal/television (not shown) using well-known on-screen presentation techniques. While the present invention is illustrated herein in the context of television programming recommendations, the present invention can be applied to any automatically generated recommendations that are based on an evaluation of user behavior, such as a viewing history or a purchase history.

According to one feature of the present invention, the television programming recommender 100 can generate television program recommendations before a viewing history 140 of the user is available, such as when a user first obtains the television programming recommender 100. As shown in FIG. 1, the television programming recommender 100 initially employs a viewing history 130 from one or more third parties to recommend programs of interest to a particular user. Generally, the third party viewing history 130 is based on the viewing habits of one or more sample populations having demographics, such as age, income, gender and education, that are representative of a larger population.

As shown in FIG. 1, the third party viewing history 130 is comprised of a set of programs that are watched and not watched by a given population. The set of programs that are watched is obtained by observing the programs that are actually watched by the given population. The set of programs that are not watched is obtained, for example, by randomly sampling the programs in the program database 200. In a further variation, the set of programs that are not watched is obtained in accordance with the teachings of U.S. patent application Ser. No. 09/819,286, filed Mar. 28, 2001, entitled "An Adaptive Sampling Technique for Selecting Negative Examples for Artificial Intelligence Applications," assigned to the assignee of the present invention and incorporated by reference herein.

According to another feature of the invention, the television programming recommender 100 processes the third party viewing history 130 to generate stereotype profiles that reflect the typical patterns of television programs watched by representative viewers. As discussed further below, a stereotype profile is a cluster of television programs (data points) that are similar to one another in some way. Thus, a given cluster corresponds to a particular segment of television programs from the third party viewing history 130 exhibiting a specific pattern.

The third party viewing history 130 is processed in accordance with the present invention to provide clusters of programs exhibiting some specific pattern. Thereafter, a user can select the most relevant stereotype(s) and thereby initialize his or her profile with the programs that are closest to his or her own interests. The stereotypical profile then adjusts and evolves towards the specific, personal viewing behavior of each individual user, depending on their recording patterns, and the feedback given to programs. In one embodiment, programs from the user's own viewing history 140 can be accorded a higher weight when determining a program score than programs from the third part viewing history 130.

The television program recommender 100 may be embodied as any computing device, such as a personal computer or workstation, that contains a processor 115, such as a central processing unit (CPU), and memory 120, such as RAM and/or ROM. The television program recommender 100 may also be embodied as an application specific integrated circuit (ASIC), for example, in a set-top terminal or display (not shown). In addition, the television programming recommender 100 may be embodied as any available television program recommender, such as the Tivo™ system, commercially available from Tivo, Inc., of Sunnyvale, Calif., or the television program recommenders described in U.S. patent application Ser. No. 09/466,406, filed Dec. 17, 1999, entitled "Method and Apparatus for Recommending Television Programming Using Decision Trees," U.S. patent application Ser. No. 09/498,271, filed Feb. 4, 2000, entitled "Bayesian TV Show Recommender," and U.S. patent application Ser. No. 09/627,139, filed Jul. 27, 2000, entitled "Three-Way Media Recommendation Method and System," or any combination thereof, each incorporated herein by reference, as modified herein to carry out the features and functions of the present invention.

As shown in FIG. 1, and discussed further below in conjunction with FIGS. 2 through 8, the television programming recommender 100 includes a program database 200, a stereotype profile process 300, a clustering routine 400, a mean computation routine 500, a distance computation routine 600 and a cluster performance assessment routine 800. Generally, the program database 200, may be embodied as a well-known electronic program guide and records information for each program that is available in a given time interval. The stereotype profile process 300 (i) processes the third party viewing history 130 to generate stereotype profiles that reflect the typical patterns of television programs watched by representative viewers; (ii) allows a user to select the most relevant stereotype(s) and thereby initialize his or her profile; and (iii) generates recommendations based on the selected stereotypes.

The clustering routine 400 is called by the stereotype profile process 300 to partition the third party viewing history 130 (the data set) into clusters, such that points (television programs) in one cluster are closer to the mean (centroid) of that cluster than any other cluster. The clustering routine 400 calls the mean computation routine 500 to compute the symbolic mean of a cluster. The distance computation routine 600 is called by the clustering routine 400 to evaluate the closeness of a television program to each cluster based on the distance between a given television program and the mean of a given cluster. Finally, the clustering routine 400 calls a clustering performance assessment routine 800 to determine when the stopping criteria for creating clusters has been satisfied.

Figure 2:
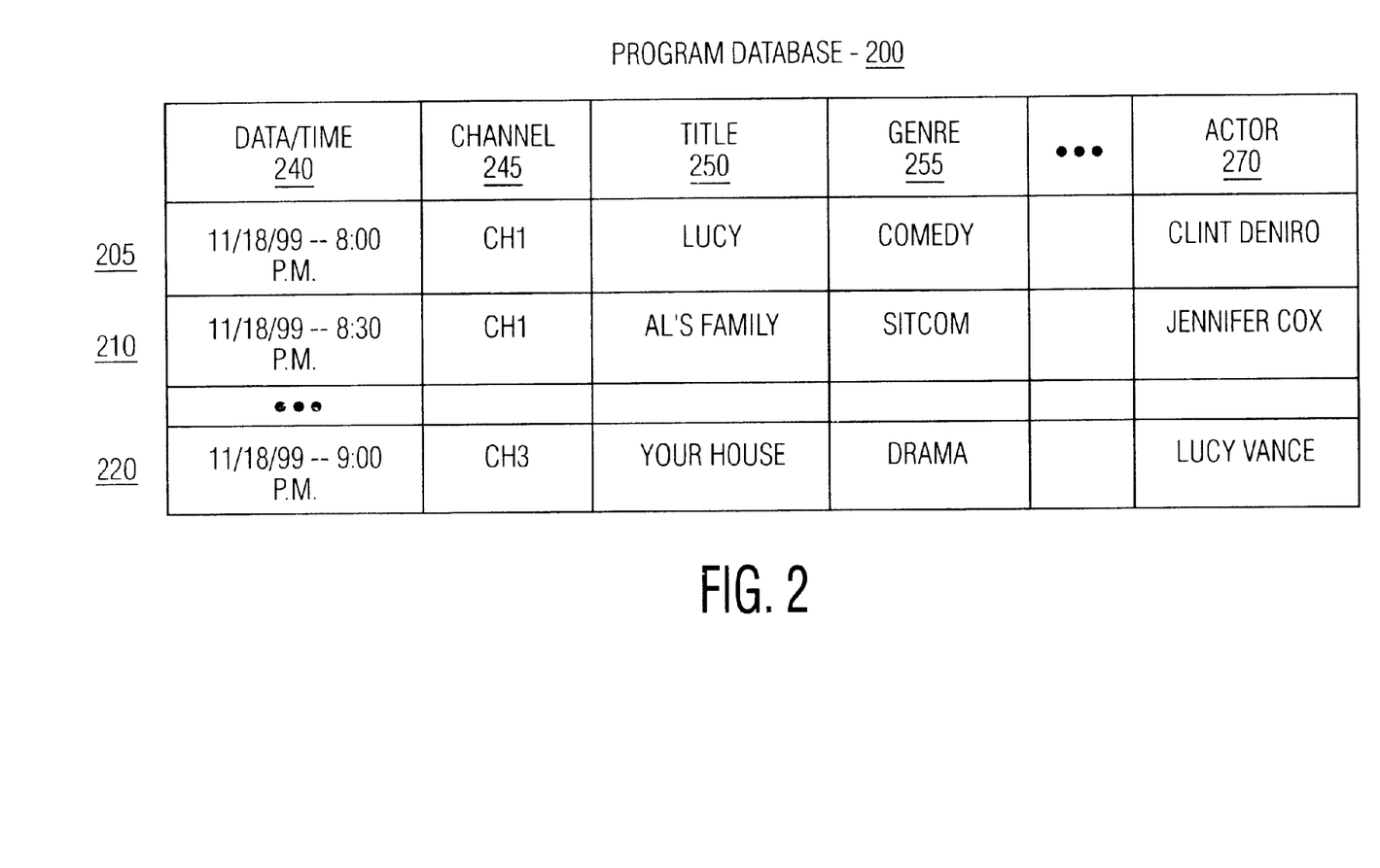
FIG. 2 is a sample table from an exemplary program database of FIG. 1.

FIG. 2 is a sample table from the program database (EPG) 200 of FIG. 1. As previously indicated, the program database 200 records information for each program that is available in a given time interval. As shown in FIG. 2, the program database 200 contains a plurality of records, such as records 205 through 220, each associated with a given program. For each program, the program database 200 indicates the date/time and channel associated with the program in fields 240 and 245, respectively. In addition, the title, genre and actors for each program are identified in fields 250, 255 and 270, respectively. Additional well-known features (not shown), such as duration and description of the program, can also be included in the program database 200.

Figure 3:
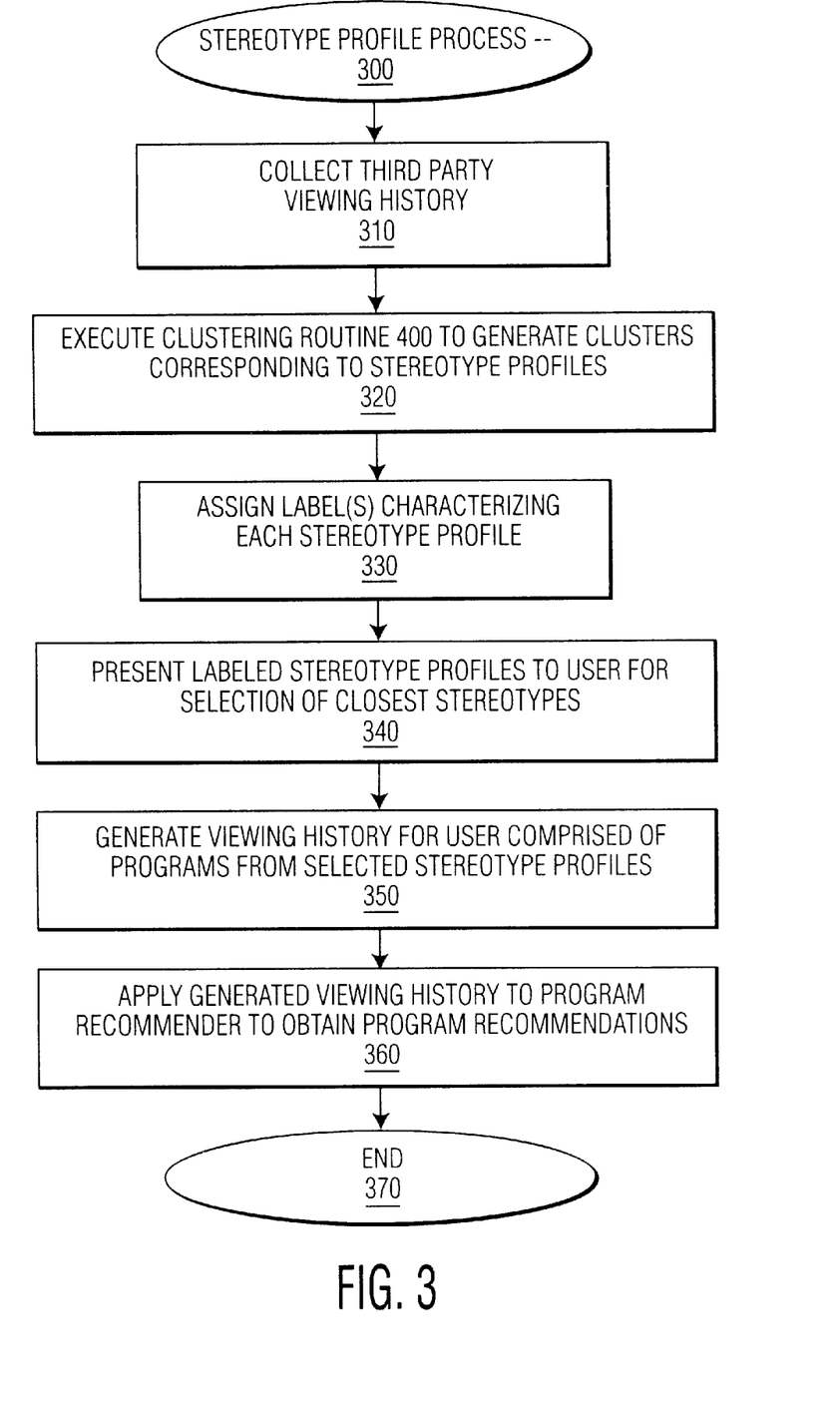
FIG. 3 is a flow chart describing the stereotype profile process of FIG. 1 embodying principles of the present invention.

FIG. 3 is a flow chart describing an exemplary implementation of a stereotype profile process 300 incorporating features of the present invention. As previously indicated, the stereotype profile process 300 (i) processes the third party viewing history 130 to generate stereotype profiles that reflect the typical patterns of television programs watched by representative viewers; (ii) allows a user to select the most relevant stereotype(s) and thereby initialize his or her profile; and (iii) generates recommendations based on the selected stereotypes. It is noted that the processing of the third party viewing history 130 may be performed off-line, for example, in a factory, and the television programming recommender 100 can be provided to users installed with the generated stereotype profiles for selection by the users.

Thus, as shown in FIG. 3, the stereotype profile process 300 initially collects the third party viewing history 130 during step 310. Thereafter, the stereotype profile process 300 executes the clustering routine 400, discussed below in conjunction with FIG. 4, during step 320 to generate clusters of programs corresponding to stereotype profiles. As discussed further below, the exemplary clustering routine 400 may employ an unsupervised data clustering algorithm, such as a "k-means" cluster routine, to the view history data set 130. As previously indicated, the clustering routine 400 partitions the third party viewing history 130 (the data set) into clusters, such that points (television programs) in one cluster are closer to the mean (centroid) of that cluster than any other cluster.

The stereotype profile process 300 then assigns one or more label(s) to each cluster during step 330 that characterize each stereotype profile. In one exemplary embodiment, the mean of the cluster becomes the representative television program for the entire cluster and features of the mean program can be used to label the cluster. For example, the television programming recommender 100 can be configured such that the genre is the dominant or defining feature for each cluster.

The labeled stereotype profiles are presented to each user during step 340 for selection of the stereotype profile(s) that are closest to the user's interests. The programs that make up each selected cluster can be thought of as the "typical view history" of that stereotype and can be used to build a stereotypical profile for each cluster. Thus, a viewing history is generated for the user during step 350 comprised of the programs from the selected stereotype profiles. Finally, the viewing history generated in the previous step is applied to a program recommender during step 360 to obtain program recommendations. The program recommender may be embodied as any conventional program recommender, such as those referenced above, as modified herein, as would be apparent to a person of ordinary skill in the art. Program control terminates during step 370.

Figure 4:
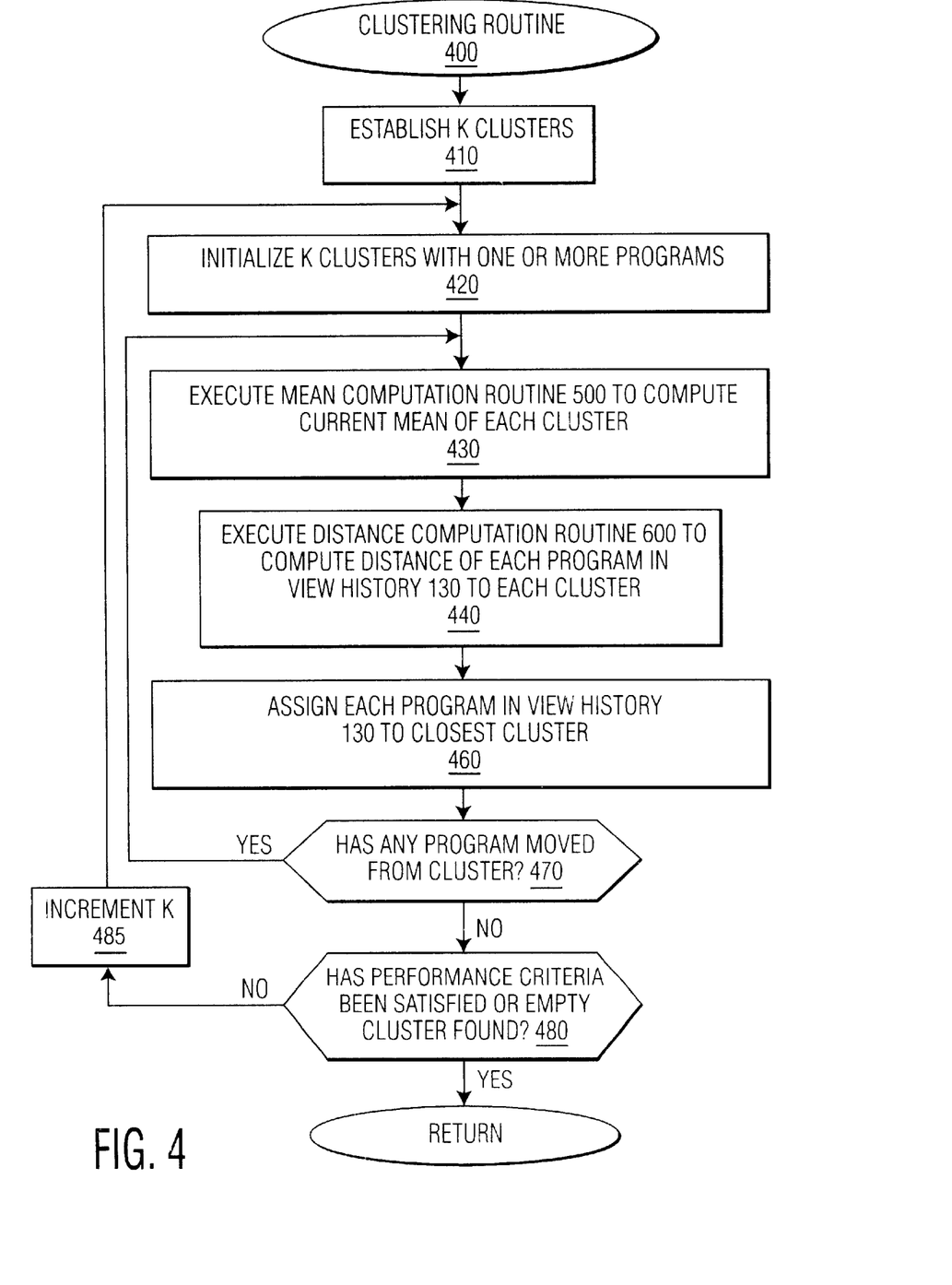
FIG. 4 is a flow chart describing the clustering routine of FIG. 1 embodying principles of the present invention.

FIG. 4 is a flow chart describing an exemplary implementation of a clustering routine 400 incorporating features of the present invention. As previously indicated, the clustering routine 400 is called by the stereotype profile process 300 during step 320 to partition the third party viewing history 130 (the data set) into clusters, such that points (television programs) in one cluster are closer to the mean (centroid) of that cluster than any other cluster. Generally, clustering routines focus on the unsupervised task of finding groupings of examples in a sample data set. The present invention partitions a data set into k clusters using a k-means clustering algorithm. As discussed hereinafter, the two main parameters to the clustering routine 400 are (i) the distance metric for finding the closest cluster, discussed below in conjunction with FIG. 6; and (ii) k, the number of clusters to create.

The exemplary clustering routine 400 employs a dynamic value of k, with the condition that a stable k has been reached when further clustering of example data does not yield any improvement in the classification accuracy. In addition, the cluster size is incremented to the point where an empty cluster is recorded. Thus, clustering stops when a natural level of clusters has been reached.

As shown in FIG. 4, the clustering routine 400 initially establishes k clusters during step 410. The exemplary clustering routine 400 starts by choosing a minimum number of clusters, say two. For this fixed number, the clustering routine 400 processes the entire view history data set 130 and over several iterations, arrives at two clusters which can be considered stable (i.e., no programs would move from one cluster to another, even if the algorithm were to go through another iteration). The current k clusters are initialized during step 420 with one or more programs.

In one exemplary implementation, the clusters are initialized during step 420 with some seed programs selected from the third party viewing history 130. The program for initializing the clusters may be selected randomly or sequentially. In a sequential implementation, the clusters may be initialized with programs starting with the first program in the view history 130 or with programs starting at a random point in the view history 130. In yet another variation, the number of programs that initialize each cluster may also be varied. Finally, the clusters may be initialized with one or more "hypothetical" programs that are comprised of feature values randomly selected from the programs in the third party viewing history 130.

Thereafter, the clustering routine 400 initiates the mean computation routine 500, discussed below in conjunction with FIG. 5, during step 430 to compute the current mean of each cluster. The clustering routine 400 then executes the distance computation routine 600, discussed below in conjunction with FIG. 6, during step 440 to determine the distance of each program in the third party viewing history 130 to each cluster. Each program in the viewing history 130 is then assigned during step 460 to the closest cluster.

A test is performed during step 470 to determine if any program has moved from one cluster to another. If it is determined during step 470 that a program has moved from one cluster to another, then program control returns to step 430 and continues in the manner described above until a stable set of clusters is identified. If, however, it is determined during step 470 that no program has moved from one cluster to another, then program control proceeds to step 480.

A further test is performed during step 480 to determine if a specified performance criteria has been satisfied or if an empty cluster is identified (collectively, the "stopping criteria"). If it is determined during step 480 that the stopping criteria has not been satisfied, then the value of k is incremented during step 485 and program control returns to step 420 and continues in the manner described above. If, however, it is determined during step 480 that the stopping criteria has been satisfied, then program control terminates. The evaluation of the stopping criteria is discussed further below in conjunction with FIG. 8.

The exemplary clustering routine 400 places programs in only one cluster, thus creating what are called crisp clusters. A further variation would employ fuzzy clustering, which allows for a particular example (television program) to belong partially to many clusters. In the fuzzy clustering method, a television program is assigned a weight, which represents how close a television program is to the cluster mean. The weight can be dependent on the inverse square of the distance of the television program from the cluster mean. The sum of all cluster weights associated with a single television program has to add up to 100%.

Computation of the Symbolic Mean of a Cluster

Figure 5:
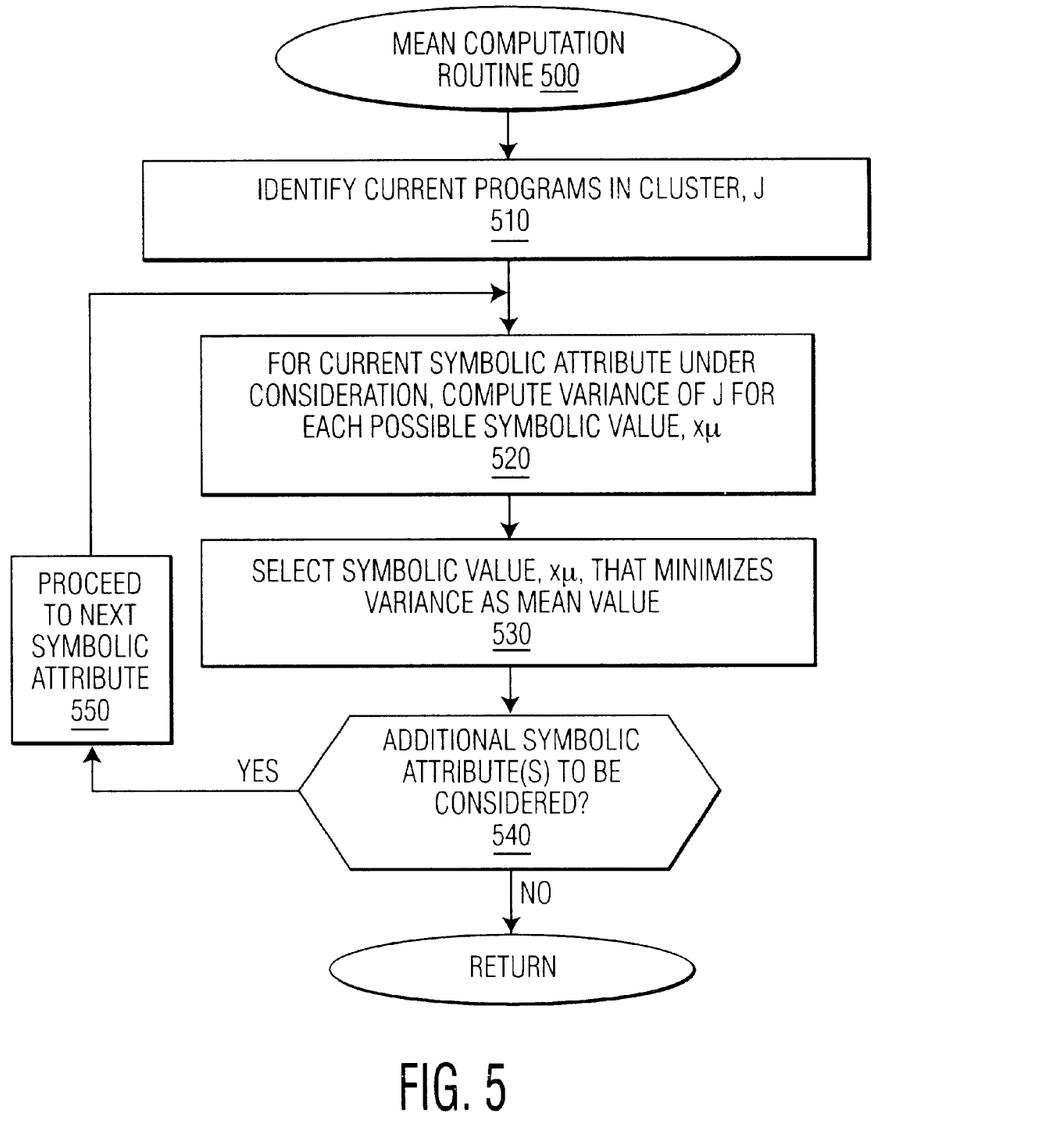
FIG. 5 is a flow chart describing the mean computation routine of FIG. 1 embodying principles of the present invention.

FIG. 5 is a flow chart describing an exemplary implementation of a mean computation routine 500 incorporating features of the present invention. As previously indicated, the mean computation routine 500 is called by the clustering routine 400 to compute the symbolic mean of a cluster. For numerical data, the mean is the value that minimizes the variance. Extending the concept to symbolic data, the mean of a cluster can be defined by finding the value of $x_\mu$ that minimizes intra-cluster variance (and hence the radius or the extent of the cluster), $$Var(J) = \Sigma_{i \in J}(x_i - x_\mu)^2 \quad (1)$$

$$\text{Cluster radius } R(J) = \sqrt{Var(J)} \quad (2)$$

where J is a cluster of television programs from the same class (watched or not-watched), $x_i$ is a symbolic feature value for show i, and $x_\mu$ is a feature value from one of the television programs in J such that it minimizes Var (J).

Thus, as shown in FIG. 5, the mean computation routine 500 initially identifies the programs currently in a given cluster, J, during step 510. For the current symbolic attribute under consideration, the variance of the cluster, J, is computed using equation (1) during step 520 for each possible symbolic value, $x_\mu$. The symbolic value, $x_\mu$, that minimizes the variance is selected as the mean value during step 530.

A test is performed during step 540 to determine if there are additional symbolic attributes to be considered. If it is determined during step 540 that there are additional symbolic attributes to be considered, then program control returns to step 520 and continues in the manner described above. If, however, it is determined during step 540 that there are no additional symbolic attributes to be considered, then program control returns to the clustering routine 400.

Computationally, each symbolic feature value in J is tried as $x_\mu$ and the symbolic value that minimizes the variance becomes the mean for the symbolic attribute under consideration in cluster J. There are two types of mean computation that are possible, namely, show-based mean and feature-based mean.

Feature-Based Symbolic Mean

The exemplary mean computation routine 500 discussed herein is feature-based, where the resultant cluster mean is made up of feature values drawn from the examples (programs) in the cluster, J, because the mean for symbolic attributes must be one of its possible values. It is important to note that the cluster mean, however, may be a "hypothetical" television program. The feature values of this hypothetical program could include a channel value drawn from one of the examples (say, EBC) and the title value drawn from another of the examples (say, BBC World News, which, in reality never airs on EBC). Thus, any feature value that exhibits the minimum variance is selected to represent the mean of that feature. The mean computation routine 500 is repeated for all feature positions, until is determined during step 540 that all features (i.e., symbolic attributes) have been considered. The resulting hypothetical program thus obtained is used to represent the mean of the cluster.

Program-Based Symbolic Mean

In a further variation, in equation (1) for the variance, $x_i$ could be the television program i itself and similarly $x_\mu$ is the program(s) in cluster J that minimize the variance over the set of programs in the cluster, J. In this case, the distance between the programs and not the individual feature values, is the relevant metric to be minimized. In addition, the resulting mean in this case is not a hypothetical program, but is a program picked right from the set J. Any program thus found in the cluster, J, that minimizes the variance over all programs in the cluster, J, is used to represent the mean of the cluster.

Symbolic Mean Using Multiple Programs

The exemplary mean computation routine 500 discussed above characterizes the mean of a cluster using a single feature value for each possible feature (whether in a feature-based or program-based implementation). It has been found, however, the relying on only one feature value for each feature during the mean computation often leads to improper clustering, as the mean is no longer a representative cluster center for the cluster. In other words, it may not be desirable to represent a cluster by only one program, but rather, multiple programs the represent the mean or multiple means may be employed to represent the cluster. Thus, in a further variation, a cluster may be represented by multiple means or multiple feature values for each possible feature. Thus, the N features (for feature-based symbolic mean) or N programs (for program-based symbolic mean) that minimize the variance are selected during step 530, where N is the number of programs used to represent the mean of a cluster.

Distance Computation Between a Program and a Cluster

Figure 6:
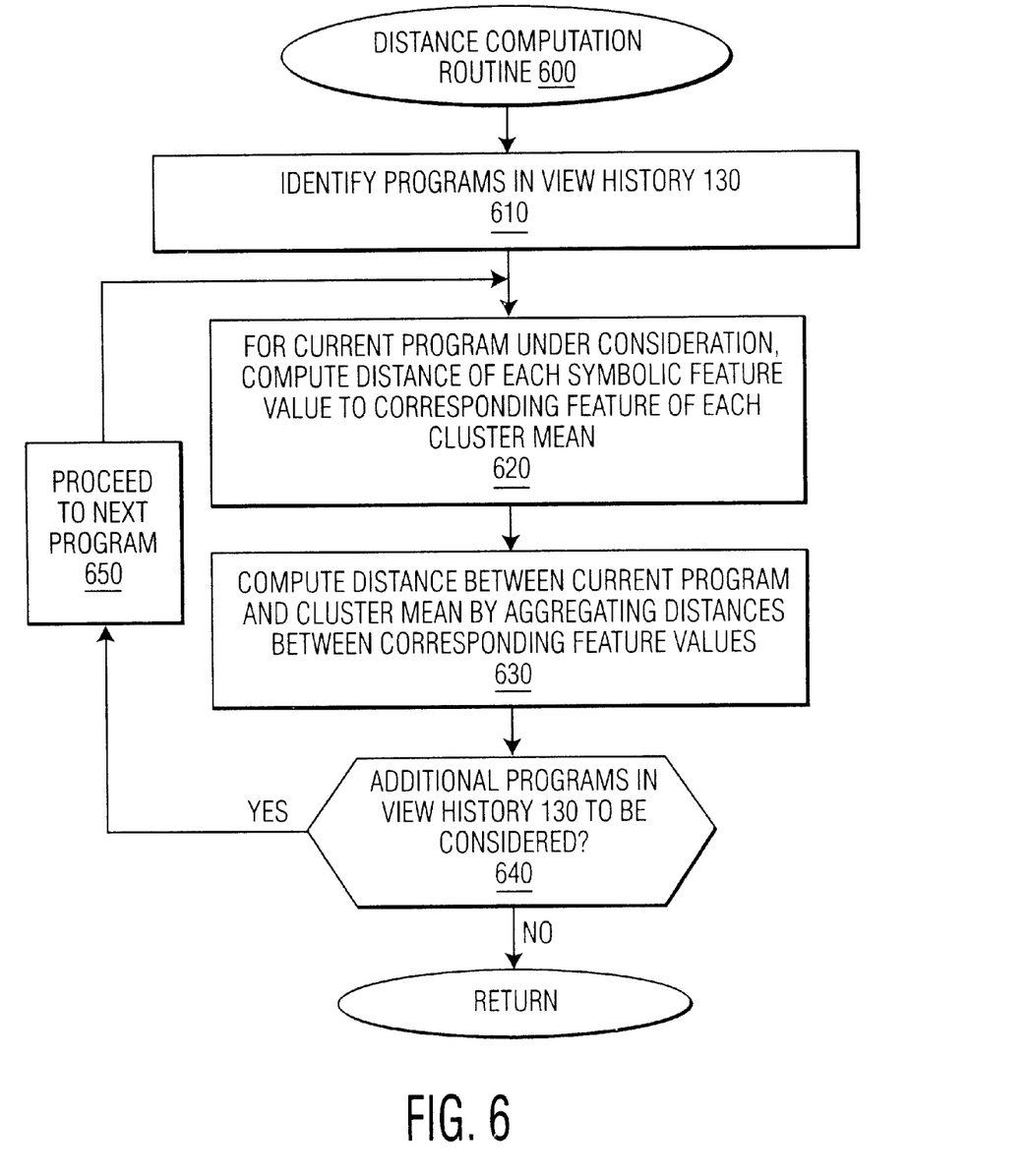
FIG. 6 is a flow chart describing the distance computation routine of FIG. 1 embodying principles of the present invention.

As previously indicated, the distance computation routine 600 is called by the clustering routine 400 to evaluate the closeness of a television program to each cluster based on the distance between a given television program and the mean of a given cluster. The computed distance metric quantifies the distinction between the various examples in a sample data set to decide on the extent of a cluster. To be able to cluster user profiles, the distances between any two television programs in view histories must be computed. Generally, television programs that are close to one another tend to fall into one cluster. A number of relatively straightforward techniques exist to compute distances between numerical valued vectors, such as Euclidean distance, Manhattan distance, and Mahalanobis distance.

Existing distance computation techniques cannot be used in the case of television program vectors, however, because television programs are comprised primarily of symbolic feature values. For example, two television programs such as an episode of "Fiends" that aired on EBC at 8 p.m. on Mar. 22, 2001, and an episode of "The Simons" that aired on FEX at 8 p.m. on Mar. 25, 2001, can be represented using the following feature vectors:

| Title: Fiends | Title: Simons |
| Channel: EBC | Channel: FEX |
| Air-date: 2001, Mar. 22 | Air-date: 2001, Mar. 25 |
| Air-time: 2000 | Air-time: 2000 |

Clearly, known numerical distance metrics cannot be used to compute the distance between the feature values "EBC" and "FEX." A Value Difference Metric (VDM) is an existing technique for measuring the distance between values of features in symbolic feature valued domains. VDM techniques take into account the overall similarity of classification of all instances for each possible value of each feature. Using this method, a matrix defining the distance between all values of a feature is derived statistically, based on the examples in the training set. For a more detailed discussion of VDM techniques for computing the distance between symbolic feature values, see, for example, Stanfill and Waltz, "Toward Memory-Based Reasoning," Communications of the ACM, 29:12, 1213–1228 (1986), incorporated by reference herein.

The present invention employs VDM techniques or a variation thereof to compute the distance between feature values between two television programs or other items of interest. The original VDM proposal employs a weight term in the distance computation between two feature values, which makes the distance metric non-symmetric. A Modified VDM (MVDM) omits the weight term to make the distance matrix symmetric. For a more detailed discussion of MVDM techniques for computing the distance between symbolic feature values, see, for example, Cost and Salzberg, "A Weighted Nearest Neighbor Algorithm For Learning With Symbolic Features," Machine Learning, Vol. 10, 57–58, Boston, Mass., Kluwer Publishers (1993), incorporated by reference herein.

According to MVDM, the distance, $\delta$, between two values, V1 and V2, for a specific feature is given by:

$$\delta(V1, V2) = \Sigma |C1i/C1 - C2i/C2|^r \qquad \text{Eq. (3)}$$

In the program recommendation environment of the present invention, the MVDM equation (3) is transformed to deal specifically with the classes, "watched" and not-watched."

$$\delta(V1, V2) = \left| \frac{C1\_watched}{C1\_total} - \frac{C2\_watched}{C2\_total} \right| + \left| \frac{C1\_not\_watched}{C1\_total} - \frac{C2\_not\_watched}{C2\_total} \right| \qquad \text{Eq. (4)}$$

In equation (4), V1 and V2 are two possible values for the feature under consideration. Continuing the above example, the first value, V1, equals "EBC" and the second value, V2, equals "FEX," for the feature "channel." The distance between the values is a sum over all classes into which the examples are classified. The relevant classes for the exemplary program recommender embodiment of the present invention are "Watched" and "Not-Watched." C1i is the number of times V1 (EBC) was classified into class i (i equal to one (1) implies class Watched) and C1 (C1_total) is the total number of times V1 occurred in the data set. The value "r" is a constant, usually set to one (1).

The metric defined by equation (4) will identify values as being similar if they occur with the same relative frequency for all classifications. The term C1i/C1 represents the likelihood that the central residue will be classified as i given that the feature in question has value V1. Thus, two values are similar if they give similar likelihoods for all possible classifications. Equation (4) computes overall similarity between two values by finding the sum of differences of these likelihoods over all classifications. The distance between two television programs is the sum of the distances between corresponding feature values of the two television program vectors.

Figure 7A:
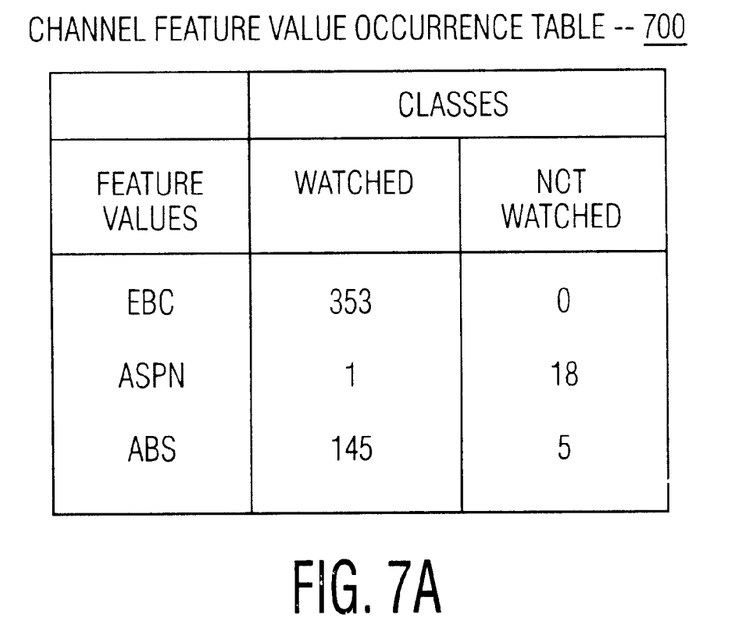
FIG. 7A is a sample table from an exemplary channel feature value occurrence table indicating the number of occurrences of each channel feature value for each class.

FIG. 7A is a portion of a distance table for the feature values associated with the feature "channel." FIG. 7A programs the number of occurrences of each channel feature value for each class. The values shown in FIG. 7A have been taken from an exemplary third party viewing history 130.

Figure 7B:
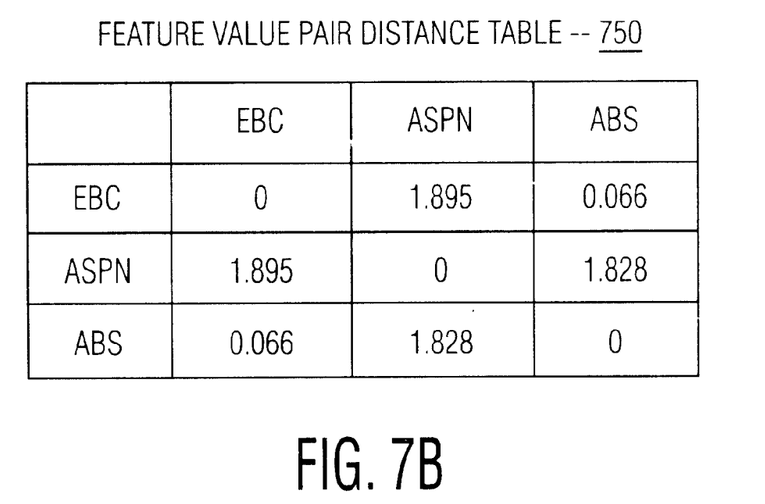
FIG. 7B is a sample table from an exemplary feature value pair distance table indicating the distance between each feature value pair computed from the exemplary counts shown in FIG. 7A.

FIG. 7B displays the distances between each feature value pair computed from the exemplary counts shown in FIG. 7A using the MVDM equation (4). Intuitively, EBC and ABS should be "close" to one another since they occur mostly in the class watched and do not occur (ABS has a small not-watched component) in the class not-watched. FIG. 7B confirms this intuition with a small (non-zero) distance between EBC and ABS. ASPN, on the other hand, occurs mostly in the class not-watched and hence should be "distant" to both EBC and ABS, for this data set. FIG. 7B programs the distance between EBC and ASPN to be 1.895, out of a maximum possible distance of 2.0. Similarly, the distance between ABS and ASPN is high with a value of 1.828.

Thus, as shown in FIG. 6, the distance computation routine 600 initially identifies programs in the third party viewing history 130 during step 610. For the current program under consideration, the distance computation routine 600 uses equation (4) to compute the distance of each symbolic feature value during step 620 to the corresponding feature of each cluster mean (determined by the mean computation routine 500).

The distance between the current program and the cluster mean is computed during step 630 by aggregating the distances between corresponding features values. A test is performed during step 640 to determine if there are additional programs in the third party viewing history 130 to be considered. If it is determined during step 640 that there are additional programs in the third party viewing history 130 to be considered, then the next program is identified during step 650 and program control proceeds to step 620 and continues in the manner described above.

If, however, it is determined during step 640 that there are no additional programs in the third party viewing history 130 to be considered, then program control returns to the clustering routine 400.

As previously discussed in the subsection entitled "Symbolic Mean Derived from Multiple Programs," the mean of a cluster may be characterized using a number of feature values for each possible feature (whether in a feature-based or program-based implementation). The results from multiple means are then pooled by a variation of the distance computation routine 600 to arrive at a consensus decision through voting. For example, the distance is now computed during step 620 between a given feature value of a program and each of the corresponding feature values for the various means. The minimum distance results are pooled and used for voting, e.g., by employing majority voting or a mixture of experts so as to arrive at a consensus decision. For a more detailed discussion of such techniques, see, for example, J.

Kittler et al., "Combing Classifiers," in Proc. of the 13th Int'l Conf. on Pattern Recognition, Vol. II, 897–901, Vienna, Austria, (1996), incorporated by reference herein.

Stopping Criteria

Figure 8:
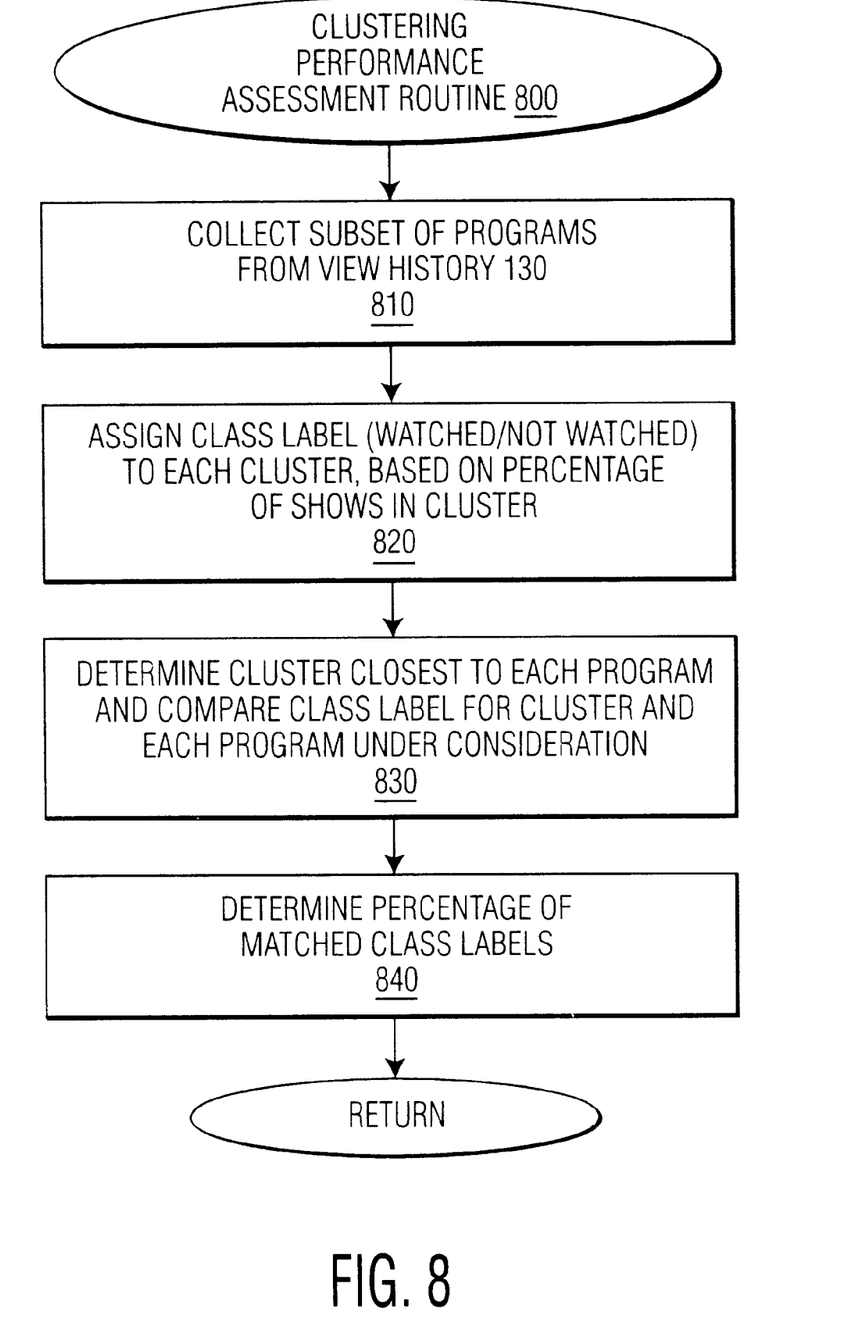
FIG. 8 is a flow chart describing the clustering performance assessment routine of FIG. 1 embodying principles of the present invention.

As previously indicated, the clustering routine 400 calls a clustering performance assessment routine 800, shown in FIG. 8, to determine when the stopping criteria for creating clusters has been satisfied. The exemplary clustering routine 400 employs a dynamic value of k, with the condition that a stable k has been reached when further clustering of example data does not yield any improvement in the classification accuracy. In addition, the cluster size can be incremented to the point where an empty cluster is recorded. Thus, clustering stops when a natural level of clusters has been reached.

The exemplary clustering performance assessment routine 800 uses a subset of programs from the third party viewing history 130 (the test data set) to test the classification accuracy of the clustering routine 400. For each program in the test set, the clustering performance assessment routine 800 determines the cluster closest to it (which cluster mean is the nearest) and compares the class labels for the cluster and the program under consideration. The percentage of matched class labels translates to the accuracy of the clustering routine 400.

Thus, as shown in FIG. 8, the clustering performance assessment routine 800 initially collects a subset of the programs from the third party viewing history 130 during step 810 to serve as the test data set. Thereafter, a class label is assigned to each cluster during step 820 based on the percentage of programs in the cluster that are watched and not watched. For example, if most of the programs in a cluster are watched, the cluster may be assigned a label of "watched."

The cluster closest to each program in the test set is identified during step 830 and the class label for the assigned cluster is compared to whether or not the program was actually watched. In an implementation where multiple programs are used to represent the mean of a cluster, an average distance (to each program) or a voting scheme may be employed. The percentage of matched class labels is determined during step 840 before program control returns to the clustering routine 400. The clustering routine 400 will terminate if the classification accuracy has reached a predefined threshold.

It is to be understood that the embodiments and variations shown and described herein are merely illustrative of the principles of this invention and that various modifications may be implemented by those skilled in the art without departing from the scope and spirit of the invention.

What is claimed is:

1. A method for partitioning a plurality of items into groups of similar items, said plurality of items corresponding to a selection history by at least one third party, said method comprising the steps of:

partitioning said third party selection history into k clusters of said plurality of items, said plurality of items including at least one of programs, content and products;

identifying at least one mean item for each of said k clusters; and assigning each of said plurality of items to one of said clusters based on a distance metric.

2. The method of claim 1, further comprising the step of incrementing said value of k until a further increment of k does not improve a classification accuracy.

3. The method of claim 1, further comprising the step of incrementing said value of k until a predefined performance threshold is reached.

4. The method of claim 1, further comprising the step of incrementing said value of k until an empty cluster is detected.

5. The method of claim 1, further comprising the step of assigning a label to each of said clusters.

6. The method of claim 5, further comprising the step of receiving a user selection of at least one cluster based on said assigned labels.

7. The method of claim 1, wherein said partitioning step further comprises the step of employing a k-means clustering routine.

8. The method of claim 1, wherein said distance metric is based on a distance between corresponding symbolic feature values of two items based on an overall similarity of classification of all instances for each possible value of said symbolic feature values.

9. The method of claim 8, wherein said distance between symbolic features is computed using a Value Difference Metric (VDM) technique.

10. The method of claim 1, wherein said step of identifying at least one mean item for each of said k clusters further comprises the steps of:

computing a variance for each of said items; and selecting said at least one item that minimizes said variance as the mean symbolic value.

11. The method of claim 1, wherein said step of identifying at least one mean item for each of said k clusters, J, further comprises the steps of:

computing a variance of each of said clusters, J, for each of said possible symbolic values, $x_\mu$, for each of said symbolic attributes; and selecting for each of said symbolic attributes at least one symbolic value, $x_\mu$, that minimizes said variance as the mean symbolic value.

12. The method of claim 1, wherein said mean is comprised of a plurality of items and wherein said distance metric for a given item in said third party selection history is based on a distance between said given item and each item comprising said mean.

13. A method for partitioning a plurality of items into groups of similar items, said plurality of items corresponding to a selection history by at least one third party, said method comprising the steps of:

partitioning said third party selection history into k clusters of said plurality of items, said plurality of items including at least one of programs, content and products;

identifying at least one mean item for each of said k clusters;

assigning each of said plurality of items to one of said clusters based on a distance metric; and incrementing said value of k until a predefined condition is satisfied.

14. The method of claim 13, wherein said predefined condition is a further increment of k does not improve a classification accuracy.

15. The method of claim 13, wherein said predefined condition is a predefined performance threshold is reached.

16. The method of claim 13, wherein said predefined condition is detection of an empty cluster.

17. The method of claim 13, wherein said mean is comprised of a plurality of items and wherein said distance metric for a given item in said third party selection history is based on a distance between said given item and each item comprising said mean.

18. A system for partitioning a plurality of items into groups of similar items, said plurality of items corresponding to a selection history by at least one third party, said system comprising:

a memory for storing computer readable code; and a processor operatively coupled to said memory, said processor configured to:

partition said third party selection history into k clusters of said plurality of items, said plurality of items including at least one of programs, content and products;

identify at least one mean item for each of said k clusters; and assign each of said plurality of items to one of said clusters based on a distance metric.

19. The system of claim 18, wherein said processor is further configured to increment said value of k until a further increment of k does not improve a classification accuracy.

20. The system of claim 18, wherein said processor is further configured to increment said value of k until a predefined performance threshold is reached.

21. The system of claim 18, wherein said processor is further configured to increment said value of k until an empty cluster is detected.

22. The system of claim 18, wherein said processor is further configured to assign a label to each of said clusters.

23. The system of claim 22, wherein said processor is further configured to receive a user selection of at least one cluster based on said assigned labels.

24. The system of claim 18, wherein said processor performs said partitioning using a k-means clustering routine.

25. The system of claim 18, wherein said distance metric is based on a distance between corresponding symbolic feature values of two items based on an overall similarity of classification of all instances for each possible value of said symbolic feature values.

26. The system of claim 25, wherein said distance between symbolic features is computed using a Value Difference Metric (VDM) technique.

27. The system of claim 18, wherein said processor identifies said at least one mean item for each of said k clusters by:

computing a variance for each of said items; and selecting said at least one item that minimizes said variance as the mean symbolic value.

28. The system of claim 18, wherein said processor identifies said at least one mean item for each of said k clusters by:

computing a variance of each of said clusters, J, for each of said possible symbolic values, $x_\mu$, for each of said symbolic attributes; and selecting for each of said symbolic attributes at least one symbolic value, $x_\mu$, that minimizes said variance as the mean symbolic value.

29. The system of claim 18, wherein said mean is comprised of a plurality of items and wherein said distance metric for a given item in said third party selection history is based on a distance between said given item and each item comprising said mean.

30. An article of manufacture for partitioning a plurality of items into groups of similar items, said plurality of items corresponding to a selection history by at least one third party, comprising:

a computer readable medium having computer readable code means embodied thereon, said computer readable program code means comprising:

a step to partition said third party selection history into k clusters of said plurality of items, said plurality of items including at least one of programs, content and products;

a step to identify at least one mean item for each of said k clusters; and a step to assign each of said plurality of items to one of said clusters based on a distance metric.

* * * * *